3,062,671
HARD ESTER WAXES AND PROCESS FOR PREPARING THEM

Josef Kaupp and Albert Thalhofer, both of Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed Nov. 10, 1959, Ser. No. 851,955
Claims priority, application Germany Nov. 25, 1958
13 Claims. (Cl. 106—268)

The present invention is concerned with hard ester waxes and a process for their manufacture.

It is known to prepare hard waxes by esterifying fatty acids of high molecular weight, in particular the montan wax acids obtained by bleaching crude montan wax with chromic acid, with mono- or polyhydric alcohols. It is, in particular, the use of dihydric and polyhydric alcohols that enables products to be obtained which are equal to or even excel the known natural waxes such as carnauba wax, ouricuri wax and candelilla wax.

As alcohols, there are generally used glycols, which are not expensive, such as ethylene glycol, propylene glycol and butylene glycol and also glycerol and trimethylol propane. Some time ago, it was also proposed to use high melting alcohols as esterification components, for example trimethylol ethane and pentaerythrite, since these alcohols lead to the formation of products having extraordinarily good properties, for example a very good hardness, a good oil-binding property and a good capacity for forming pastes. However, the use of these alcohols presents difficulties which are due to the high melting points of the alcohols. The esterification of fatty acids and wax acids of high molecular weight is normally carried out at a temperature within the range of 110° to 130° C. The high melting point of, for example, pentaerythrite (262° C.) or trimethylol ethane (196° C.) necessitates, however, esterification temperatures of at least 200° C. (cf. German printed patent application No. B 27 923 IVb/12o). At these temperatures already the two aforesaid alcohols present the inconvenience of subliming out of the wax melt. The crystals condense at the cooler places of the apparatus, for example at the lid or stirring means, and when larger aggregates of crystals have formed they ball back into the melt where they do not dissolve so that a nonhomogeneous product containing lots of little lumps forms. This product either cannot be used at all for industrial purposes or its industrial use involves great difficulties. Moreover, due to the high esterification temperatures, care must be taken that the process is carried out with the strict exclusion of oxygen or otherwise dark coloured products form.

The high melting point and the high esterification temperature that must consequently be applied involve the further disadvantage that the esterification of a mixture of diols of low molecular weight, for example ethylene glycol, propylene glycol and butylene glycol, with higher melting alcohols, for example trimethylol ethane and pentaerythrite, which is often carried out in practice cannot be performed in a single operation. For in this case, the esterification temperature is already in the immediate vicinity of the boiling point of the above-mentioned diols. The esterification must consequently be carried out in stages. This means that the fatty acids and wax acids of higher molecular weight must first be esterified with the high melting alcohol, then the diols must be added and esterification has to be continued at a temperature within the range of 110° to 130° C. The difficulties are not diminished when the stages of the esterification are carried out inversely. On the contrary, a part of the more readily volatile diols can then be set free by re-esterification and distil off. In both cases, however, the reaction has to be carried out at different temperatures, which makes the process complicated and which is undesirable in practice.

The present invention is based on the observation that the disadvantages which have been described above can be avoided and waxes having excellent properties can be obtained by esterifying the oxalkylation products of higher melting alcohols instead of the higher melting alcohols themselves, for example trimethylol ethane and pentaerythrite, with fatty acids and/or wax acids. Owing to the low melting point of the substances used in the process of the invention the esterification temperature may be reduced to less than 150° C. for at a temperature below 150° C. already the oxalkylation products of the two aforesaid alcohols can be melted with aliphatic acids of high molecular weight, viz. fatty acids and/or wax acids, in the desired proportions and in such a manner that a homogeneous melt is obtained and they can also be esterified at such a low temperature. At temperatures below 150° C. the oxalkylation products of trimethylol ethane or pentaerythrite do not exhibit any tendency to sublimate so that inhomogeneous, lumpy products as have been mentioned above cannot form. Besides, at such a temperature the reaction products are much less sensitive to the action of oxidizing substances so that the presence of small portions of oxygen does not impair the colour of the products. Another advantage of the process of the invention is that the oxalkylation products of pentaerythrite or trimethylol ethane can be esterified in one operation and at the same temperature in admixture with diols of low molecular weight. It is particularly advantageous that it is not necessary that all hydroxyl groups of the aforesaid alcohols are oxalkylated. Oxalkylation products in which only one hydroxyl group is oxalkylated can, for example, be esterified with fatty acids or wax acids of high molecular weight in a homogeneous phase at a temperature below 200° C. already. The oxalkylation products to be esterified may, of course, also contain 2 or more oxalkylated hydroxyl groups. If all the hydroxyl groups are to be oxalkylated more than 1 mole of alkylene oxide may be added to each hydroxyl group. Suitably at most 1 mole of alkylene oxide is added per hydroxyl group. It is also possible to add a larger quantity, for example 1 to 3 moles, of alkylene oxide to each hydroxyl group. The more moles of alkylene oxide are added, the softer are the products obtained.

The oxalkylation of the higher melting alcohols, for example pentaerythrite and trimethylol ethane, can be brought about in various ways, for example by a reaction with alkylene chlorohydrines carried out in the presence of alkalis. Oxalkylation is preferably brought about by reacting the polyhydric alcohols with an alkylene oxide, for example, ethylene oxide, propylene oxide and/or butylene oxide. If it is desired to oxalkylate several hydroxyl groups of a molecule of pentaerythrite or trimethylol ethane the oxalkylation may be brought about by the simultaneous use of different alkylene oxides, for example, by using a mixture of ethylene oxide and propylene oxide.

The above-mentioned oxalkylated higher melting alcohols may be used alone or in admixture with dialcohols and/or polyalcohols which advantageously contain 2 to 10 or more, and preferably 2 to 6 carbon atoms and the hydroxyl groups of which are bound to aliphatic carbon atoms, for example, ethylene glycol, propylene glycol, butylene glycol, hexane diol, glycerol, hexane triol, sorbitol, decane diol or di- or polymethylol compounds of aromatic hydrocarbons such as benzene, toluene, xylene, ethyl benzene, cumene, cymene or naphthalene. Long-chain monohydric alcohols such as dodecyl alcohol, octadecyl alcohol and cetyl alcohol are also suitable. When mixtures of the alcohols used in the process of the present invention with the above-mentioned polyhydric alcohols are used the latter may be present in a quantity of up to 90, preferably up to 50 mole percent.

As aliphatic acids there are suitably used carboxylic acids containing at least 12, and preferably more than 18 carbon atoms, for example behenic acid, arachinic acid and preferably wax acids obtained by bleaching crude montan wax and/or by oxidizing air-oxidation products of paraffins with chromic acid. There may also be used acids obtained by the cracking and subsequent air oxidation of low pressure polyethylene. For special purposes, for example for the preparation of lubricants or soft waxes, there may also be used other acids, for example lauric acid, oleic acid or stearic acid. The same esterification products may be obtained from acid derivatives such as acid halides, preferably acid chlorides, or acid anhydrides.

Towards the end of or after the esterification, the esterification products may be modified in known manner by the addition of metal soaps, for example aluminum stearate and magnesium behenate, or the free carboxyl-groups still present may be neutralized in known manner by a reaction with metal salts and/or metal oxides or hydroxides, for example zinc acetate, barium acetate, calcium oxide and lithium hydroxide. The metal soaps may also be added after the partial neutralization.

The waxes prepared in the manner described above are in general light yellow and have an extraordinarily great hardness. They are especially distinguished by their good capacity for forming pastes and their good oil-binding property. The more oxalkylene groups the esterification products contain, the better can the waxes be emulsified with ionic emulsifiers. Waxes of this kind are therefore particularly suitable for the preparation of wax emulsions as are used to-day, for example, for the preparation of bright drying polish emulsions.

The following examples serve to illustrate the invention but they are not intended to limit it thereto, the parts being by weight.

*Example 1*

306 parts of a mixture of 50% of deresinified crude montan wax and 50% of synthetically prepared paraffin oxidized by air, which had been oxidized with chromosulphuric acid and which had an acid value of 112 were heated together with 30 parts of a product obtained by the addition reaction of 2 moles of ethylene oxide with 1 mole of pentaerythrite and with the addition of 0.5 part of sulphuric acid of 20% strength in a vessel provided with stirring means, under the atmosphere of nitrogen, to a temperature within the range of 110° to 130° C. until the acid value had decreased to 30.

A light yellow, extraordinarily hard wax was obtained which had a good gloss-producing property, a good compatibility with paraffin and a flow point/drop point (according to Ubbelohde) of 95/96° C.

*Example 2*

412 parts of a montan wax acid obtained by bleaching crude montan wax with chromic acid and having an acid value of 137 were heated as described in Example 1 together with 16 parts of ethylene glycol and 25 parts of a product obtained by the addition reaction of 1 mole of ethylene oxide with 1 mole of trimethylol ethane and with the addition of 0.6 part of sulphuric acid of 20% strength to a temperature within the range of 110° to 130° C. until the acid value had decreased to 25.

A light yellow, very hard wax was obtained which had an excellent gloss-producing property and a good oil-binding property. Its saponification value was 161, its flow point/drop point 78/79° C.

*Example 3*

390 parts of a montan wax acid obtained by bleaching crude montan wax with chromic acid and having an acid value of 137 were heated as described in Example 1 together with 60 parts of a product obtained by the addition reaction of 1 mole of ethylene oxide with 1 mole of pentaerythrite and with the addition of 0.6 part of sulphuric acid of 20% strength to a temperature within the range of 110° to 130° C. until the acid value had decreased to 20. The resulting wax was reacted with 60 parts of low pressure polyethylene which had been cracked and oxidized and which had an acid value of 12, a flow point/drop point of 116/116.5° C. and a molecular weight of about 1074 and a light yellow, very hard wax was obtained which had the following characteristic values: acid value 16, saponification value 122, flow point/drop point 111/112° C. The wax had a very good compatibility with paraffin and a capacity for forming pastes which was equal to that of calcinated esters of montan wax.

*Example 4*

(a) 188 parts of bleached montan wax acid were esterified in the manner described in Example 1 and in the presence of 0.3 part of sulphuric acid of 20% strength with 25 parts of a product that had been obtained by the addition reaction of 4 holes of ethylene oxide with 1 mole of pentaerythrite. A yellow, very hard wax was obtained which had an acid value of 49, a saponification value of 157 and a flow point/drop point of 78/79° C.

(b) This wax was reacted with 3.15% of calcium oxide at 130° C. and a brittle, extraordinarily hard wax was obtained which had an acid value of 14, a saponification value of 118, a flow point/drop point of 99/101° C., a good capacity for forming pastes and a good gloss-producing property. These properties could be modified by the addition of aluminum stearate.

*Example 5*

412 parts of montan wax acid obtained by bleaching crude montan wax with chromic acid and having an acid value of 137 were heated as described in Example 1 together with 170 parts of pentaerythrite oxalkylated with 3 moles of propylene oxide per hydroxyl group and with the addition of 0.8 part of sulphuric acid of 20% strength to a temperature within the range of 110 to 130° C. until the acid value had decreased to 30. A light brown wax was obtained which had the following characteristic values: saponification value 126, flow point/drop point 79/80° C.

We claim:

1. A waxy esterification product of (A) an at most mono-unsaturated aliphatic carboxylic acid containing at least 12 carbon atoms and at most a carbon chain as long as the montan wax acids and (B) a polyhydric alcohol selected from the group consisting of oxalkylation products of pentaerythritol, oxalkylation products of trimethylol ethane, a mixture of such oxalkylation products and a mixture of such oxalkylation products with up to 90 mol percent of additional polyhydric alcohols in which the hydroxy groups are bound to saturated aliphatic carbon atoms, the oxalkylated polyhydric alcohol of group (B) being obtained by an addition of at least one mol of alkylene oxide of 2 to 4 carbon atoms to one mol of the said polyhydric alcohol and of at most one mol of alkylene oxide of 2 to 4 carbon atoms to each hydroxyl group, the carboxylic acid and the polyhydric alcohol components being contained in said esterification product in an amount that the ratio between carboxylic groups and hydroxy groups is in the range between 1:0.7 and 1:1.4.

2. A process for the manufacture of waxy esterification products wherein (A) a compound selected from the group consisting of at most mono-unsaturated aliphatic carboxylic acids containing at least 12 carbon atoms and at most a carbon chain as long as the montan wax acids and ester forming derivatives thereof are esterified at a temperature below 200° C. with (B) a polyhydric alcohol selected from the group consisting of oxalkylation products of pentaerythritol, oxalkylation products of trimethylol ethane, a mixture of such oxalkylation products and a mixture of polyhydric alcohols in which the hydroxy groups are bound to saturated aliphatic carbon atoms, the oxalkylated polyhydric alcohol of group (B) being obtained by an addition of at least one mol of alkylene oxide of 2 to 4 carbon atoms to one mol of the said polyhydric alcohol and of at most one mol of alkylene oxide of 2 to 4 carbon atoms to each hydroxyl group, the carboxylic acid and the polyhydric alcohol components being applied in the amount that the ratio between carboxlic groups and hydroxy groups is in the range between 1:0.7 and 1:1.4.

3. A process for the manufacture of waxy esterification products wherein (A) a compound selected from the group consisting of at most mono-unsaturated aliphatic carboxylic acids containing at least 12 carbon atoms and at most a carbon chain as long as the montan wax acids and ester forming derivatives thereof are esterified at a temperature of at least 110° C., but below 150° C., with (B) a polyhydric alcohol selected from the group consisting of oxalkylation products of pentaerythritol, oxalkylation products of trimethylol ethane, a mixture of such oxalkylation products and a mixture of such oxalkylation products with up to 90 mol percent of additional polyhydric alcohols in which the hydroxy groups are bound to saturated aliphatic carbon atoms, the oxalkylated polyhydric alcohol of group (B) being obtained by an addition of at least one mol of alkylene oxide of 2 to 4 carbon atoms to one mol of the said polyhydric alcohol and of at most one mol of alkylene oxide of 2 to 4 carbon atoms to each hydroxyl group, the carboxylic acid and the polyhydric alcohol components being applied in an amount that the ratio between carboxylic groups and hydroxy groups is in the range between 1:0.7 and 1:1.4.

4. A waxy esterification product as claimed in claim 1 wherein the acid component substantially consists of acids which have been obtained by chromic acid bleaching of air oxidation products of paraffins.

5. A waxy esterification product as claimed in claim 1 wherein the acid component substantially consists of acids which have been obtained by chromic acid bleaching of mixtures of montan wax and air-oxidation products of paraffins.

6. A waxy esterification product as claimed in claim 1 wherein the acid component substantially consists of acids which contain more than 18 carbon atoms.

7. A waxy esterification product as claimed in claim 1 wherein the acid component substantially consists of acids which have been obtained by chromic acid bleaching of a montan wax.

8. Waxy esterification products as claimed in claim 1 wherein the oxalkylation product is an oxethylation product.

9. Waxy esterification products as claimed in claim 1 wherein the polyhydric alcohol other than oxalkylated pentaerythritol and trimethylol ethane contains 2 to 10 carbon atoms.

10. Waxy esterification products as claimed in claim 1 wherein the polyhydric alcohol other than oxalkylated pentaerythritol and trimethylol ethane contains 2 to 6 carbon atoms.

11. Waxy esterification products as claimed in claim 1 wherein the polyhydric alcohol other than oxalkylated pentaerythritol and trimethylol ethane is present in the alcohol component in an amount of up to 50 mol percent.

12. Waxy esterification products as claimed in claim 1 which also contain metal salts of aliphatic carboxylic acids of at least 12 carbon atoms.

13. A process as claimed in claim 2 wherein the non-esterified carboxylic groups are partially neutralized to yield metal salts.

References Cited in the file of this patent

UNITED STATES PATENTS

| | | |
|---|---|---|
| 2,597,204 | Todd et al. | May 20, 1952 |
| 2,684,948 | Cross | July 27, 1954 |
| 2,846,330 | Berthold et al. | Aug. 5, 1958 |
| 2,875,081 | Duro | Feb. 24, 1959 |

FOREIGN PATENTS

| | | |
|---|---|---|
| 151,943 | Australia | Oct. 29, 1948 |
| 375,842 | Great Britain | June 27, 1932 |
| 480,234 | Canada | Jan. 15, 1952 |